United States Patent Office 3,190,268
Patented June 22, 1965

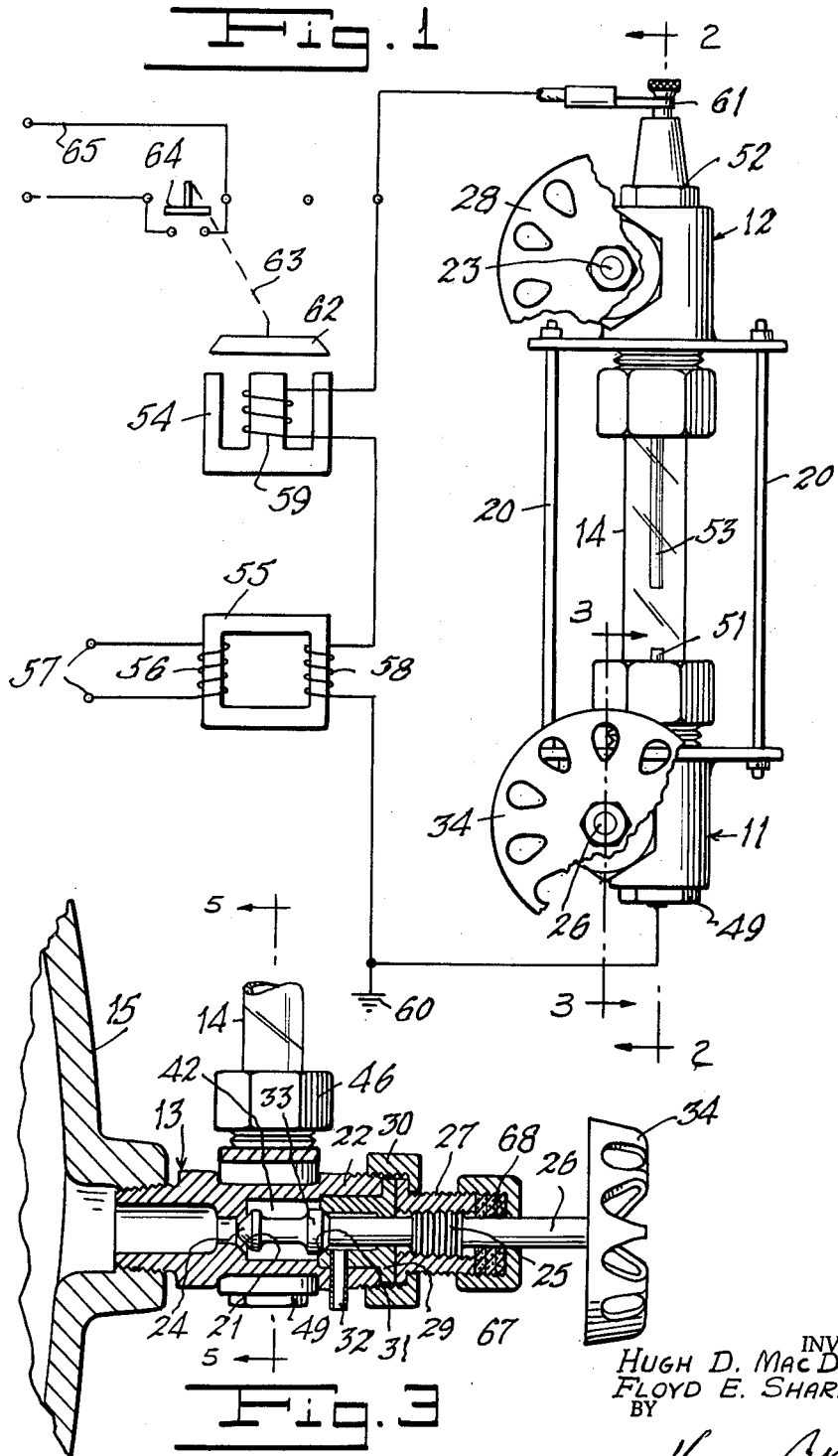

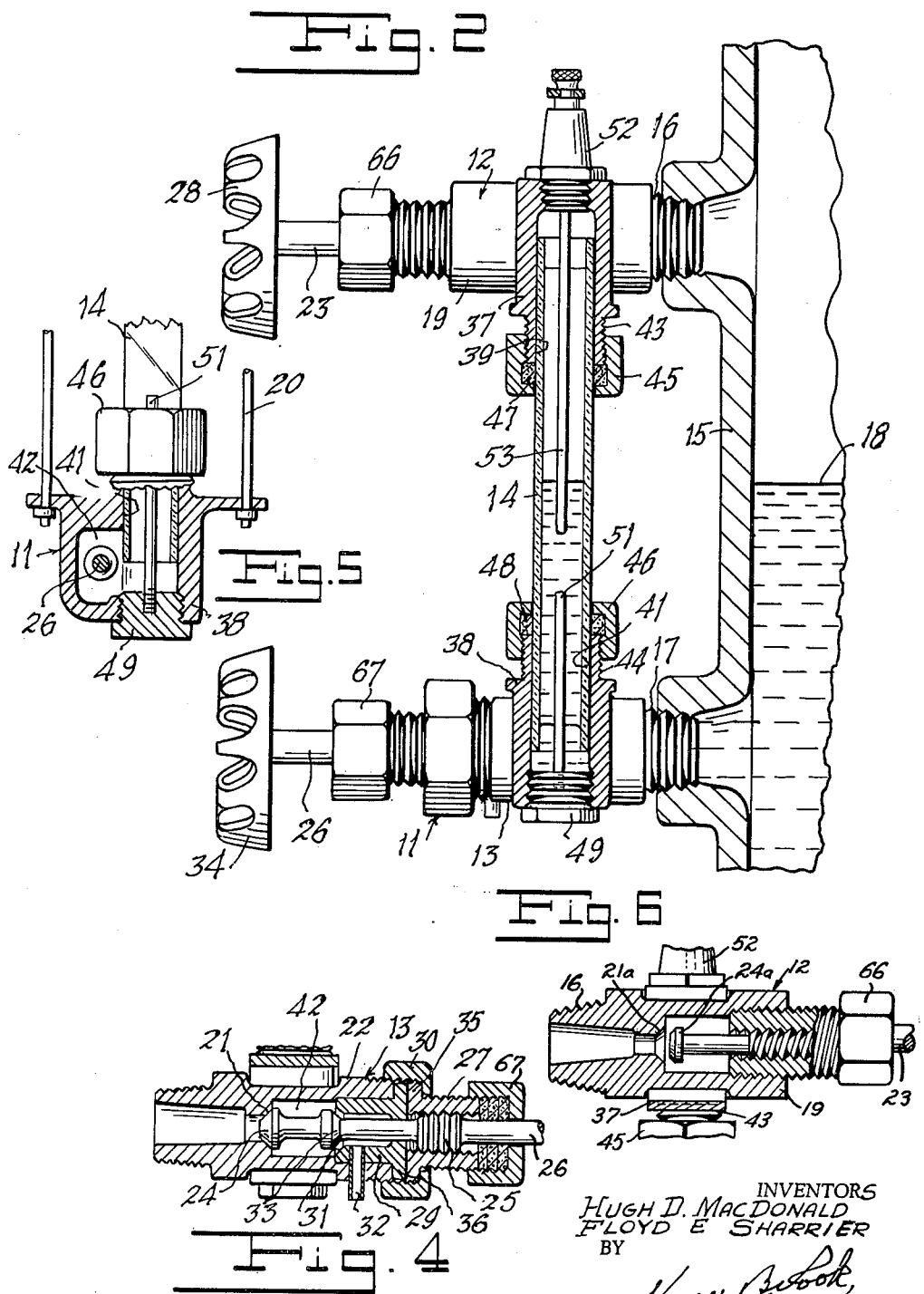

3,190,268
COMBINATION LOW-WATER CUT-OUT
AND GAUGE GLASS
Hugh D. MacDonald, 208 Mt. Pleasant Ave., Hanover, N.J., and Floyd E. Sharrier, 120 Filbert St., Roselle Park, N.J.
Filed Feb. 26, 1963, Ser. No. 260,987
1 Claim. (Cl. 122—504)

This invention relates to gauge glasses for liquid containers including steam boilers and, more particularly, to such combined with means for cutting out the operation of a boiler on which applied when the water therein gets dangerously low.

An object of our invention is to provide a combination low-water cut-out and gauge glass, to replace existing gauge glasses, and which can be easily and quickly installed on any boiler or similar device.

Another object of our invention is to provide a combination low-water cut-out including probe rod electrodes mounted in the gauge glass arranged on a steam boiler so that, when the stem of a double-valve-containing lower valve unit is turned clockwise, it causes one valve therein to engage its seat and shut off fluid from the boiler, at the same time disengaging the other valve from its seat, so that fluid is blown out through a drain port, thereby draining the associated guage glass, and uncovering the associated probe rod electrode in the gauge glass to break a circuit to a low-water cut-out relay, to thereby shut off the fire to the boiler.

A further object of our invention is to provide a gauge glass and a probe electrode mounted therein in a novel and improved manner, making it possible to see the water line and said rod the end of which will be magnified by the water up to the water level, and making it easy to adjust the end of the probe electrode to the proper point to cut off the burner when the water reaches a predetermined level in the gauge glass.

These and other objects and advantages will become apparent from the following detailed description when taken with the accompanying drawings. It will be understood that the drawings are for purposes of illustration and do not define the scope or limits of the invention, reference being had for the latter purpose to the appended claim.

In the drawings, wherein like reference characters denote like parts in the several views:

FIGURE 1 is a fragmentary side elevational view of a combination low-water cut-out and gauge glass, with a relay circuit diagram for low-water cut-out purposes, being also indicated.

FIGURE 2 is a fragmentary vertical elevational view at right angles to that of FIGURE 1, with parts in section on the line 2—2 of FIGURE 1, in the direction of the arrows, a portion of an associated steam being fragmentarily illustrated in vertical section.

FIGURE 3 is a fragmentary vertical sectional view of the lower valve unit on the line 3—3 of FIGURE 1, in the direction of the arrows, with parts in elevation.

FIGURE 4 is a fragmentary vertical sectional view, corresponding to FIGURE 3, but wherein the associated valves of said unit are shown in the inner rather than the outer portion.

FIGURE 5 is a fragmentary vertical sectional view on the line 5—5 of FIGURE 3, in the direction of the arrows, with parts in elevation.

FIGURE 6 is a fragmentary vertical sectional view, similar to FIGURE 3 of the upper valve unit.

Referring to the drawings in detail, there is shown a combination low-water cut-out and gauge glass device, generally designated 11, comprising an upper valve unit 12, a lower valve unit 13 and a gauge glass 14 spanning the distance therebetween and protected by conventional guards 20. Both of the valve units 12 and 13 are adapted to be threadably connected with an associated boiler or similar device 15, as by threading indicated respectively at 16 and 17. The device 12 is connected to the boiler 15 above the normal level of the contained water 18, whereas the valve 13 is connected to the boiler below said level.

The upper valve unit 12 comprises a hollow body member 19, which is the part which is threadably connected to the boiler as indicated at 16. This member has a valve seat, 21a corresponding with the valve seat 21 in the body member 22 of the lower valve unit 13. The body member 19 also carries a valve stem 23 which has on its inner end a valve, 24a corresponding with the valve 24 of the lower valve member 13. Said stem 23 is threaded into the body member 19 of the valve in a manner similar to the threadable engagement between the threaded portion 25 on the valve stem 26 of the lower valve unit 13 with its adapter portion 27. Thus said valve unit 12 may be cut off from the boiler 15 or connected thereto at will, depending on which way the valve stem 23 is turned, as by means of the handle 28 thereon.

The lower valve unit 13 also comprises a hollow body member, here designated 22, which is the part which is threadably connected to the boiler 15, as indicated at 17. This member carries the previously-mentioned valve seat 21 and receives a separate insert or filler member 29 which carries an opposed valve seat 31. This insert member 29 also carries a drain pipe or port member 32 which passes downwardly therefrom through a corresponding aperture in the body member 22. This pipe 32 is for draining water or other fluid from the valve unit 13 when the valves 24 and 33, adapted to only alternately and respectively engage the seats 21 and 31, are in the innermost position illustrated in FIGURE 4.

Both of the valves 24 and 33 are formed on the previously-mentioned valve stem 26, which desirably carries at its outer end a handle 34. This handle is for turning the valve stem 26 so as to effect the engagement of one valve or the other with its seat, and the simultaneous removal of the other valve from its seat. The valve stem 26 carries external threads 25 which mate with internal threads on the adapter portion or member 27. The portion 27 is held in place with respect to the valve unit body 22 by means of a union nut 30. Said nut 30 forces the outstanding flange 35 on said adapter member 27 into engagement with the corresponding outwardly extending flange 36 on the insert portion 29 and holds both the adapter member and said insert portion into firm union with the body member 22.

Both of the valve body members 19 and 22 have portions 37 and 38, respectively, laterally offset in the same direction from the plane of the valve stems 23 and 26, as illustrated in the drawings. These offset portions 37 and 38 open toward one another, as indicated at 39 and 41, to receive the gauge glass 14, as shown most clearly in FIGURE 2. These laterally offset portions respectively communicate with the interior of the body member 19 between the valve seat thereof and the threaded portion 16, and the space 42 between the valve seats 21 and 31 of the body member 22. The portions opening toward one another are externally threaded, as indicated respectively at 43 and 44, and respectively receive gland nuts 45 and 46 holding packing 47 and 48 around the gauge glass 14 to prevent leakage.

Insertion and removal of the gauge glass 14 is provided for by a lower aperture alined with said glass and normally closed by a plug 49 threadably engaging the portion 38 of the lower valve unit 13. Upon removal of said plug 49 and loosening of the gland nuts 45 and 46, the gauge glass 14 may be removed for cleaning or replacement as desired. The plug 49 desirably carries a normally upstanding electrode or probe member 51 which is long enough so as to reach above the top of the gland nut 46 so as to be visible through the gauge glass 14. This arrangement makes the water in said gauge glass more clearly visible because of the magnification of the probe 51, as well as decreasing the electrical impedance of the water in said glass.

The offset portion 37 of the upper valve unit 12 is also provided with a threaded opening at its upper end which normally receives an insulated electrode or probe-carrying device 52. The electrode or probe 53 of this device extends downwardly through the upper part of the gauge glass 14 and terminates at a position in spaced relation to the end of the ground electrode 51 corresponding with the level of the water 18 when at a point so low as to be considered dangerous. This is for the purpose of cutting off the operation of the burner or fire of the boiler by breaking an electrical control circuit through said probe. The insertion of the probe 53 in the water in the gauge glass 14 also facilitates the observation of the level of water in said boiler because of the magnification of the water-inserted end portion of the probe, as compared with the portion thereabove.

Referring now to the wiring diagram illustrated in FIGURE 1, there is shown an electrical circuit for controlling the level of a liquid, such as water, in a boiler or other container by means of one or more electrodes, such as those here designated 51 and 53, to provide a control arrangement which is simple, accurate and positive. Here we have a relay 54 matched to a transformer 55. The latter has a primary winding 56 connected to a suitable source of power, such as a conventional 60 cycle power supply 57. The transformer 55 has a step-down secondary winding 58, which is connected through the winding or solenoid 59 of the relay 54 to the electrode 53 through electrical terminal 61 thereof.

The other side of the secondary winding 58 is grounded through the ground electrode 51, as indicated at 60, and thereby connected to the grounded plug 49 and its electrode or probe 51, if used, for effecting a grounding thereof. When the liquid touches the electrode or probe 53, as illustrated in FIGURE 2, for example, said liquid provides a conductive path between said electrode and the grounded liquid container or boiler, closing a circuit through the transformer secondary 58 and relay coil or solenoid 59. Thus the relay 54 is energized and operates its armature 62 and through control means 63, diagrammatically indicated by a dotted line, closes the normally-open load contact 64 and thereby energizes a circuit 65, which controls the operation of the fire or burner for the boiler 15, thereby turning said burner on.

If, during the operation of the boiler, the water 18 therein drops and breaks contact with the upper probe or electrode 53, the circuit is broken through the solenoid 59, effecting a de-energization of the relay 54 and allowing the armature 62 and its controlled contact 64 to open or move to the positions illustrated in FIGURE 1. This action opens the circuit to the burner of the boiler 15 and terminates operation thereof until the water level has been raised to again make contact with the electrode 53. As an alternative, or in addition to the control of the burner or fire of the boiler, the circuit 65 may also control the operation of a low-water alarm system which may be visual, audible, or both, as desired.

Although not previously mentioned, leakage around the valve stems 23 and 26 is desirably prevented by the illustrated conventional gland nuts 66 and 67 respectively holding packing 68 in fluid-tight engagement about said stems. It will also be understood that changes in the details of the illustrated construction may be made within the spirit and scope of the invention.

We claim:

A combination low water cut-out and gauge glass device for steam boilers, comprising an upper valve unit having a hollow body with an upper valve seat and adapted to be connected to a boiler above the normal water level therein through said valve seat, a lower valve unit having a hollow body with a first valve seat and adapted to be connected through said valve seat to said boiler below the normal water level therein, said lower valve unit body having a drain port and a second valve seat connecting said hollow body to said drain port, upper and lower valve stems threadably mounted in said upper and lower hollow bodies, respectively, a valve on the upper valve stem coacting with said upper valve seat for cutting off the hollow body of the upper valve unit from the boiler when the valve is closed and for admitting steam from the boiler to said hollow body when the valve is open, a pair of opposed valves longitudinally spaced along the lower valve stem in the hollow body of the lower valve unit, means to position said opposed valves so that in one position one valve engages the first valve seat and the other valve is spaced from the second valve seat to simultaneously cut off said hollow body from the associated boiler and open said drain port and in another position the first-mentioned valve is spaced from the first valve seat and the second-mentioned valve engages the second valve seat to simultaneously admit water from the boiler to said hollow body and close said drain port, the hollow body of each valve unit having a portion laterally offset from the longitudinal axis of the corresponding valve stem and provided with a chamber that communicates with the interior space of the hollow body outwardly of the valve seat thereof which is employed to cut off sad hollow body from the boiler, each offset portion having an opening that faces toward and is axially aligned with the opening of the other offset portion adapted to receive one end of a gauge glass tube, a gauge glass tube having one end removably secured in each of said openings of the offset portions, each offset portion having another opening axially aligned with and facing away from the opening that receives said gauge glass tube, an insulated probe electrode normally mounted in and closing the last-mentioned opening in the upper valve unit and extending into said gauge glass tube, a plug normally closing the last-mentioned opening in the lower valve unit to allow the insertion and removal of said gauge glass and a second probe electrode secured in said plug and extending upwardly into the gauge glass in spaced relation to the first-mentioned probe electrode to serve as a ground connection, and means adapted to connect said plug in an electronic circuit that is closed and opened by variations of the liquid level in the gauge glass tube below and above the lower end of the first-mentioned probe electrode, respectively.

References Cited by the Examiner

UNITED STATES PATENTS

| 569,167 | 10/96 | Britton | 73—332 |
|---|---|---|---|
| 1,156,933 | 10/15 | Rowe | 73—332 |
| 1,201,128 | 10/16 | Wirth | 73—332 |
| 2,078,479 | 4/37 | Briggs | 122—504 |
| 2,189,473 | 2/40 | Poor | 73—332 |
| 2,274,939 | 3/42 | Ray | 122—504 |

FOREIGN PATENTS 815,043   6/59   Great Britain.

FREDERICK I. MATTESON, Jr., *Primary Examiner.*

PERCY L. PATRICK, *Examiner.*